United States Patent [19]

Murphy

[11] Patent Number: 4,922,234
[45] Date of Patent: May 1, 1990

[54] SEWER ALARM

[76] Inventor: Paul J. Murphy, 25 Garland Ave., Pittsfield, Mass. 01201

[21] Appl. No.: 275,371

[22] Filed: Nov. 23, 1988

[51] Int. Cl.$^5$ .............................................. G08B 21/00
[52] U.S. Cl. .................................... 340/608; 340/623; 73/307; 200/84 R
[58] Field of Search ............... 340/608, 604, 624, 625, 340/623; 200/81,9 HG, 84 R; 73/307, 308

[56] References Cited

U.S. PATENT DOCUMENTS

| | | | |
|---|---|---|---|
| 2,761,037 | 8/1956 | Thomas et al. | 200/83 |
| 2,985,187 | 5/1961 | Hamilton | 137/242 |
| 3,185,789 | 5/1965 | Gunther | 340/624 X |
| 3,757,316 | 9/1973 | Fiorenzo | 340/608 |
| 4,091,365 | 5/1978 | Allen | 200/84 G |
| 4,392,128 | 7/1983 | Young et al. | 340/616 |
| 4,398,186 | 8/1983 | Statz | 340/616 |
| 4,418,712 | 12/1983 | Braley | 340/624 X |
| 4,546,346 | 10/1985 | Wave et al. | 340/608 |
| 4,569,312 | 2/1986 | Riddell et al. | 340/616 X |
| 4,778,957 | 10/1988 | Crowell | 340/625 X |

Primary Examiner—Joseph A. Orsino
Assistant Examiner—Jeffery A. Hofsass
Attorney, Agent, or Firm—Fleit, Jacobson, Cohn, Price, Holman & Stern

[57] ABSTRACT

An elongated hollow body is provided with a mid-length transverse partition and one end of the body is mountable from a sewer pipe in lieu of a cleanout plug thereof and contains a buoyant mercury switch tethered to the partition through the utilization of thin, flexible and relatively insulated conductors passing through the partition in fluid tight sealed engagement therewith and electrically connected to spaced contacts within the mercury switch. The other end of the body on the side of the partition remote from the buoyant mercury switch supports a battery, a momentarily actuatable test switch and an electrically actuated signal generating device, the mercury switch, signal generating device and battery being electrically connected in a loop-type circuit. A bypass circuit is provided for bypassing the mercury switch and the test switch is serially connected in the bypass circuit.

10 Claims, 1 Drawing Sheet

U.S. Patent  May 1, 1990  4,922,234
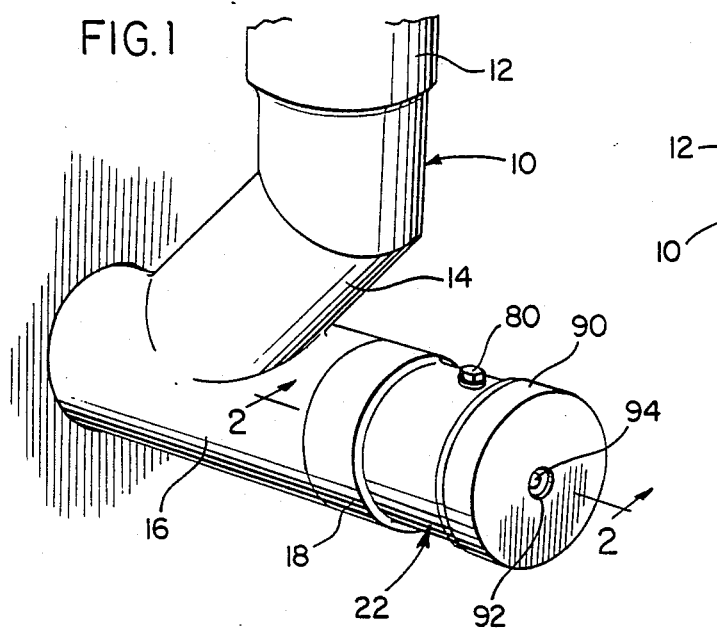
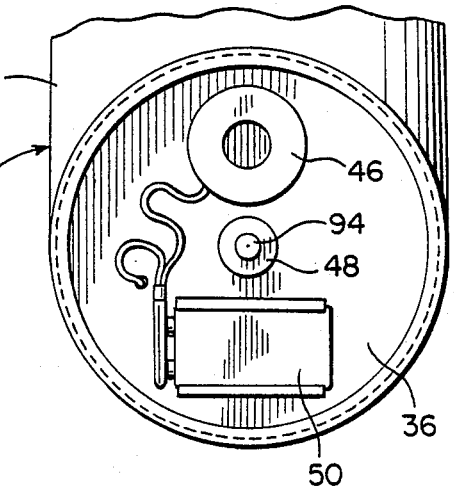
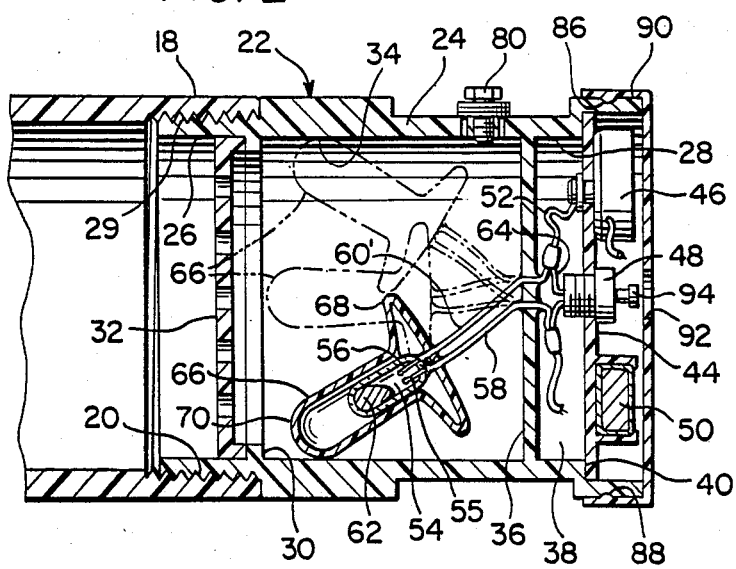
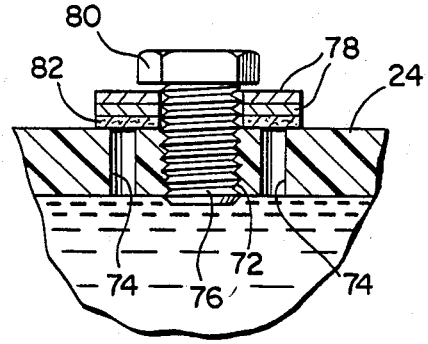
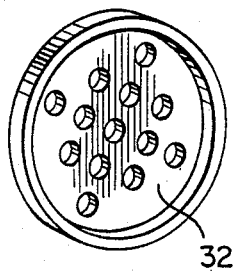
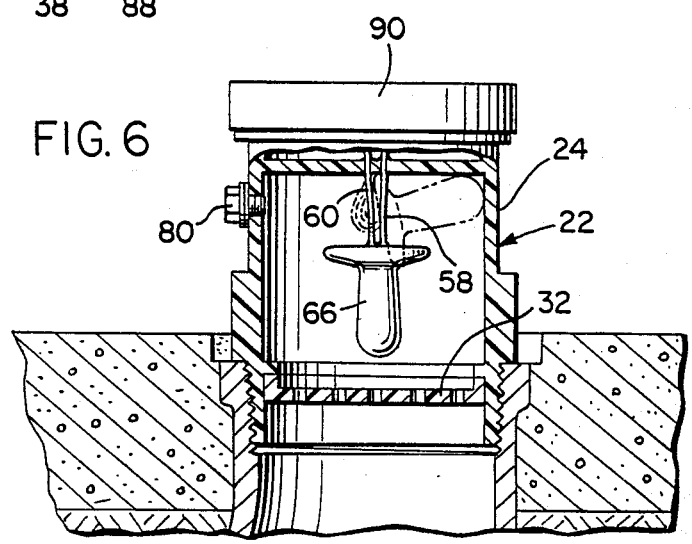

SEWER ALARM

BACKGROUND OF THE INVENTION

1. Field of the Invention

This invention relates to a replacement sewer pipe cleanout plug to be installed in lieu of a cleanout plug and operative to actuate an electrical alarm responsive to an increase in liquid level within the mounting area of the sewer pipe in which the alarm has been installed.

It is also envisioned that the alarm of the instant invention may enjoy functional usage in environments other than those associated with a sewer pipe but which may be subject to an increase in liquid level.

2. Description of Related Art

Various different forms of sewer liquid level alarms as well as other forms of liquid level alarms including some of the general structural and operational features of the invention heretofore have been provided such as those disclosed in U.S. Pat. Nos. 2,761,037, 2,985,187, 3,757,316, 4,091,365, 4,392,128, 4,398,186, 4,546,346 and U.S. Pat. No. 4,569,312. However, these previously known devices do not include the overall combination of structural features of the instant invention and are not, therefore, capable of functioning in the location of a replaced sewer pipe cleanout plug in the same manner accomplished by the instant invention.

SUMMARY OF THE INVENTION

The present invention resides in the provision of a sewer alarm assembly to replace the main sewer cleanout plug found in any home or business dwelling. The alarm assembly may be adapted to replace a main sewer cleanout plug of various different sizes through the utilization of a multi-threaded adapter. However, such an adapter is not specifically disclosed herein, inasmuch as multi-size threaded adapters are well-known in other environments.

The alarm assembly has been designed for installation in either a horizontal, vertical or 45 degree inclined position and may therefore be used in lieu of substantially all sewer pipe cleanout plugs.

The alarm assembly utilizes a float mounted mercury switch to control the corresponding alarm circuit and the float is tethered through the utilization of thin, flexible and insulated electrical conductors in a manner enabling the float to work in any of the abovementioned alternate operating positions of the alarm assembly as well as all positions therebetween.

The float is of unique shape and the float shape, in conjunction with the float tethering flexible conductors, adapts the alarm switch for operation in substantially any usually encountered position of a sewer cleanout plug.

The main object of this invention is to provide an alarm assembly which will actuate an electrically operable alarm system responsivé to liquid backing up in an associated sewer system above a predetermined level.

Another object of this invention is to provide an alarm assembly in accordance with the preceding object and which may be mounted in place of a sewer pipe cleanout plug of substantially any given size.

Yet another object of this invention is to provide an alarm system including a trapped air vent which will automatically close within a predetermined time after direct contact with sewer line liquids.

Another very important object of this invention is to provide an alarm system incorporating structure which will automatically preclude the entrance of debris into that portion of the alarm having the alarm circuit operating float therein.

Another important object of this invention is to provide an alarm assembly for controlling an electrically actuated alarm signalling device and with the alarm assembly being constructed in a manner such that sewer gases will be excluded from "make and break" portions of the electrical circuit of the alarm assembly.

Still another object of this invention is to provide a sewer alarm incorporating an alarm test switch.

A final object of this invention to be specifically enumerated herein is to provide a sewer alarm in accordance with the preceding objects and which will conform to conventional forms of manufacture, be of simple construction and easy to install so as to provide a device that will be economically feasible, longlasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a portion of a sewer pipe including a sewer cleanout plug and with the alarm assembly of the instant invention mounted from the sewer pipe in lieu of the cleanout plug.

FIG. 2 is an enlarged fragmentary vertical sectional view taken substantially upon the plane indicated by the section line 2—2 of FIG. 1.

FIG. 3 is an elevational view of the assemblage illustrated in FIG. 2 as seen from the right side thereof and with the protective cover removed.

FIG. 4 is a fragmentary enlarged vertical sectional view illustrating the, vent portion of the alarm assembly.

FIG. 5 is a perspective view of the debris screen portion of the alarm assembly.

FIG. 6 is a fragmentary vertical sectional view of the alarm assembly in a vertically disposed position as a replacement for a sewer pipe vertically oriented cleanout plug.

DESCRIPTION OF THE PREFERRED EMBODIMENT

Referring now more specifically to the drawings, the numeral 10 generally designates a conventional sewer pipe including an upper vertical section 12 terminating downwardly in a Y-fitting 14 whose horizontal portion 16 terminates at one end as at 18 and is internally threaded at 20 for removably receiving a conventional cleanout plug (not shown).

The sewer pipe 10 is subject to "sewer backup" wherein liquids in the sewer pipe downstream from the fitting 14 will back up in the sewer pipe to and above the Y-fitting 14.

The Y-fitting 14 usually is in a basement portion of the associated building and the backup of liquid in the sewer pipe to a level no higher than the Y-fitting 14 causes little problem. However, if liquid within the sewer pipe 10 backs up therein to an elevation considerably above the Y-fitting 14, sewer liquids may back into and overflow bathroom and other fixtures within the building. Accordingly, inasmuch as the portion of the sewer pipe downstream from the Y-fitting 14 usually is inaccessible, the lowest point in the sewer pipe 10 to sense a backup of liquid within the sewer pipe 10 is at the Y-fitting 14.

The sewer alarm of the instant invention is referred to in general by the reference numeral 22 and is operative to render an audible alarm (a remote visual alarm may be added). The sewer alarm 22 comprises an alarm assembly including a hollow, generally cylindrical main body 24 including opposite ends 26 and 28. One end 26 is externally threaded as at 29 and may be threaded into the threaded end 18 of the horizontal portion 16 defining an access opening of the Y-fitting 14. The other end 26 includes an internal shoulder 30 against which a debris screen or disc 32 is seated and the interior of the end 26 defines a generally cylindrical cavity 34 opening outwardly through the screen 32 and closed at its opposite inner end by a partition 36 secured across the interior of the main body 24 between the ends 26 and 28, a second cavity 38 being defined in the end 28 on the side of the partition 36 remote from the cavity 34.

An internal shoulder 40 is defined within the cavity 38 and a mounting disc 44 is secured within the cavity 38 against the shoulder 40 in any convenient manner. The disc 44 mounts an electrically actuated sound generating device 46, a test switch 48 and a replaceable battery 50 on the side thereof remote from the partition 36, although a portion of the switch 48 extends through the mounting disc 44.

A loop-type circuit 52 electrically connects the sound generating device 46, the battery 50 and a mercury switch capsule 54 in series, the capsule 54 including a pair of internal spaced contacts 55 and 56. The circuit 52 includes thin, insulated and flexible conductors 58 and 60 defining the contacts 55 and 56 at one pair of ends and including opposite ends passing through the partition 36 in fluid tight sealed engagement therewith. The capsule 54 contains a quantity of mercury 62 for electrically bridging the contacts 55 and 56 when the end of the capsule 54 in which the contacts 55 and 56 are disposed is lowered relative to the opposite end of the capsule. Also, a bypass circuit 64, connected in parallel with the circuit 52, is provided in which the test switch 48 is serially connected and the circuit 64 bypasses the mercury switch capsule 54 and the conductors 58 and 60.

The mercury switch capsule 54 is contained and extends longitudinally within a hollow float body 66 including large and small transverse dimension ends 68 and 70. The large transverse dimension end 68 corresponds to the end of the mercury switch capsule 54 containing the contacts 55 and 56. Of course, the conductors 58 and 60 pass into the float body 66 in fluid tight sealed engagement therewith and support the mercury switch capsule 54 in substantially stationary position within the float body 66.

The upper peripheral portion of the main body 24 includes a vertical, threaded radial bore 72 formed therein and a pair of small diameter vent bores 74 spaced longitudinally of the body 24 on either side of the threaded bore 72. A threaded cap screw 76 is adjustably threaded in the bore 72 and has a pair of washers 78 disposed thereon beneath the head 80 of the cap screw 76 and a liquid absorbent and expandable washer 82 is disposed on the cap screw 76 beneath the washers 78 and includes diametrically opposite peripheral portions thereof loosely overlying the upper ends of the vent bores 74.

The cap screw 76 is adjusted in a manner such that the head 80 thereof is spaced slightly above the uppermost washer 78 and the weight of the washers 78 acts upon the washer 82 to form a loose closure for the vent bores 74. However, in the event liquid backs up within the sewer pipe 10 to a level above the horizontal portion 16 of the Y-fitting 14, the liquid will rise through the bores 74 and contact the absorbent washer 82, whereupon the latter will become wetted and will therefore expand to substantially tightly close the upper ends of the bores 74. Thus, the bores 74 serve as a relief for air trapped within the adjacent portion of the horizontal portion 16 and within the main body 24 to thereby allow the level of liquid within the main body 24 to rise and cause the float body 66 to swing from the solid line position thereof illustrated in FIG. 2 to the uppermost phantom line position illustrated in FIG. 2. When the float body 66 is in the uppermost phantom line position illustrated in FIG. 2, the quantity of mercury 62 will bridge the contacts 55 and 56 and thus close the circuit 52 causing the signal generating device 46 to be operated The outer end of the main body 24 includes an outer circumferential peripheral groove 86 in which an internal circumferential rib 88 is seated when a plastic closure cap 90 is removably snap fittingly engaged over the corresponding main body end. The center of the cap 90 includes an access opening 92 therein through which access may be had to the momentary plunger-type actuator 94 for the test switch 48. When the plunger-type actuator 94 is displaced inwardly, the circuit 52 is closed by the bypass circuit 64 to thus actuate the signal generating device and test its operability.

The sewer alarm 22 also is operative in a vertical position such as that illustrated in FIG. 6 of the drawings. Because the conductors 58 and 60 are quite flexible, when the sewer alarm 22 in FIG. 6 experiences a liquid level rise therein, the float body 66 is moved from the solid line position thereof illustrated in FIG. 6 to the phantom line position illustrated in FIG. 6. Also, the sewer alarm 22 is operative in any inclined position between the horizontal position of FIG. 2 and the vertical position in FIG. 6. Of course, the air vent illustrated in FIG. 4 also is operational when the sewer alarm is vertically oriented as illustrated in FIG. 6.

Thus, it may be seen that a sewer alarm is provided which may be used not only in a horizontal position as well as a vertical position, but in any inclined position between the horizontal and vertical positions illustrated in FIGS. 1 and 6.

The provision of the insulated and flexible conductors 58 and 60 as tether means for the float body 66 and the mercury switch capsule 54 disposed therein in conjunction with the effective length of the conductors 58 and 60 as compared to the radius of the cavity 34 insures that elevated liquid level within the cavity 34 will cause the mercury switch capsule 54 to be tilted to a position with the mercury 62 bridging the contacts 55 and 56 in order to actuate the signal generating device 46 as long as the sewer alarm 22 is either horizontally disposed as illustrated in FIG. 1, vertically disposed as illustrated in FIG. 6 or variously inclined between the horizontal and vertical mounted positions thereof.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A sewer drain pipe alarm assembly for replacing the plug closure of an access opening for a sewer drain pipe, said assembly including a hollow main body having opposite ends, one of said ends being open and including mounting means for mounting said open one end from said access opening with said open one end opening inwardly of said access opening, said hollow body defining a central, generally cylindrical cavity therewithin having first and second ends, said cavity opening, at said first end thereof, outwardly of said one open end and being closed at its opposite other end by a fluid impervious partition extending across the interior of said body and spaced therealong from said open one end toward said opposite other end, an elongated tiltable switch body including first and second ends and a pair of spaced contacts at said switch body first end, said switch body including means operative to electrically connect and disconnect said contacts when said switch body first end is lowered and elevated, respectively, relative to said switch body second end, an elongated float body in which said switch body is longitudinally disposed and including large and small transverse width ends corresponding to said switch body first and second ends, respectively, a pair of relatively electrically insulated conductor means extending through a central portion of said partition in fluid sealed engagement therewith and including thin, flexible elongated conductor portions extending from said partition central portion into said float body large transverse width end and electrically connected to said contacts, said conductor portions being of effective length, outwardly of said large transverse width end, greater than one-half the width of said large transverse width end and less than the spacing of said central portion of said partition from the interior surfaces of said cavity, said conductor portions comprising flexible tether means for said float body within said cavity, the combined effective length of said flexible tether means and said float body being less than the spacing of said partition inwardly of said first end of said body, the portions of said conductor means on the side of said partition remote from said cavity being serially connected in an alarm circuit for control of said circuit by said tiltable switch body.

2. The alarm assembly of claim 1 wherein the other end of said hollow main body defines a second outwardly opening cavity, and electrically actuated alarm means mounted in said second cavity and serially connected in said alarm circuit, and a source of electrical potential also serially connected in said alarm circuit.

3. The sewer alarm of claim 1 including a debris screen panel secured in said cavity outwardly of said float body for preventing the entrance of debris into said cavity inwardly of said screen panel.

4. The sewer alarm of claim 1 wherein one peripheral side portion of said hollow body includes a vent opening formed therethrough opening into said cavity, and closure means non-fluid tight sealingly closing the outer end of said vent opening, said closure means including a liquid absorbent and expandable body captively loosely secured over said vent opening and expandable, when wetted, into substantially fluid tight sealed engagement with said vent opening.

5. The sewer alarm of claim 1 wherein said switch body comprises a mercury switch capsule.

6. The alarm assembly of claim 1 wherein the other end of said hollow main body defines a second outwardly opening cavity, and electrically actuated alarm means mounted in said second cavity and serially connected in said alarm circuit, and a source of electrical potential also serially connected in said alarm circuit, said alarm circuit also having a normally open, momentarily closable test switch serially connected in a bypass circuit connected in parallel with the first mentioned circuit to bypass said switch body.

7. The alarm assembly of claim 1 wherein said hollow main body comprises a cylindrical member, said mounting means including external threads on said one end of said hollow main body.

8. The sewer alarm of claim 1 wherein one peripheral side portion of said hollow body includes a vent opening formed therethrough opening into said cavity, and closure means non-fluid tight closing the outer end of said vent opening, said closure means including a liquid absorbent and expandable body captively and loosely secured over said vent opening and expandable, when wetted, into substantially fluid tight sealed engagement with said vent opening, the other end of said hollow main body defining a second outwardly opening cavity, and electrically actuated alarm means mounted in said second cavity and serially connected in said alarm circuit, a source of electrical potential also being serially connected in said alarm circuit.

9. The alarm assembly of claim 8 including a debris screen panel secured in the first mentioned cavity outwardly of said float body for preventing the entrance of debris into the first mentioned cavity inwardly of said screen panel.

10. The alarm assembly of claim 9 wherein said alarm circuit also has a normally open, momentarily closable test switch serially connected in a bypass circuit, said bypass circuit being connected and parallel with the first mentioned circuit to bypass said switch body.

* * * * *